United States Patent [19]

Crouse et al.

[11] 4,351,983
[45] Sep. 28, 1982

[54] SPEECH DETECTOR WITH VARIABLE THRESHOLD

[75] Inventors: William G. Crouse; Charles R. Knox, both of Raleigh, N.C.

[73] Assignee: International Business Machines Corp., Armonk, N.Y.

[21] Appl. No.: 198,504

[22] Filed: Oct. 20, 1980

Related U.S. Application Data

[63] Continuation of Ser. No. 17,791, Mar. 5, 1979, abandoned.

[51] Int. Cl.³ .................. G10L 1/04; H04B 15/00
[52] U.S. Cl. ........................ 179/1 SC; 179/1 VC
[58] Field of Search ............ 179/1 SC, 1 VC, 1 P; 455/79, 218, 221, 222; 340/148; 375/76, 8; 364/554

[56] References Cited

U.S. PATENT DOCUMENTS

| | | | |
|---|---|---|---|
| 3,700,812 | 10/1972 | Springett | 179/1 P |
| 3,832,491 | 8/1974 | Sciulli et al. | 179/1 |
| 3,882,458 | 5/1975 | Hoeschele, Jr. et al. | 340/146.1 |
| 3,909,532 | 9/1975 | Rabiner et al. | 179/1 SC |
| 4,025,721 | 5/1977 | Graupe et al. | 179/1 P |
| 4,028,496 | 6/1977 | La Marche et al. | 179/1 SC |
| 4,199,729 | 4/1980 | Durand et al. | 328/151 |

Primary Examiner—Errol A. Krass
Assistant Examiner—E. S. Kemeny
Attorney, Agent, or Firm—Edward H. Duffield

[57] ABSTRACT

A speech activity detection circuit and method are described in which a digitized sample of the analog speech signal in a communications system is taken n times in a period of time t. The magnitude M of each sample is calculated and the largest value of M which is encountered over a given period t is stored as a peak magnitude $\overline{M}(t)$. This value is compared to a value $\overline{M}(t-1)$ which is the smallest value of $\overline{M}(t)$ from prior periods. The lesser of the two values is stored as the new value for $\overline{M}(t-1)$. The process is continued for i periods and at the end of the $i^{th}$ period, the value $\overline{M}(t-1)$ is multiplied by a constant k and the product is stored as the threshold value for the next i periods of time t.

3 Claims, 2 Drawing Figures

SPEECH DETECTOR WITH VARIABLE THRESHOLD

This is a continuation of application Ser. No. 17,791, filed Mar. 5, 1979, now abandoned.

TECHNICAL FIELD

This invention relates to analog or digital voice communications systems such as those usually employed in long distance communications using radio transmission channels. In particular, the invention is related to communications systems such as those used in satellite transmission schemes, speech storage systems and voice activity compression techniques in which speech signal detectors are utilized.

PRIOR ART

In communications systems employing satellites or using radio channel communication or speech storage, the capacity of the channel in terms of bandwidth, storage, or time is at a premium. In order to make the maximum use of the available capacity, techniques of voice activity compression are often used. Such techniques take advantage of the fact that during human speech, many periods of inactivity during which information is not conveyed exist. During such periods of time it is possible to transmit active portions of other conversations on the same channel, thereby increasing the actual usage of the channel and the effective transmission of more informative data.

Naturally, a mechanism for recognizing the periods during which speech is present is a primary requisite at the heart of any voice activity compression system. These mechanisms have been referred to in the prior art as "speech detectors" and that phrase will be used herein for the overall function and apparatus employed for this purpose.

Some prior art speech detectors are well known. These have been of two general types. The first type uses a technique of spectrum analysis in which the frequency spectrum of a received signal is analyzed in order to detect speech. The performance of such a detector is excellent, but it is expensive to implement and may not operate in real time because of the extensive digital or computer processing required in order to analyze the signal patterns using Fourier transforms for example in order to isolate those analog signals which contain speech data as compared to noise or inactivity.

The second type of prior art speech detector ordinarily used compares the magnitude of a received signal instantaneously in question to a fixed threshold value. If the signal magnitude exceeds the threshold it is classified as a speech signal. This type of detector works well provided that the background noise in the system is well below the threshold level and that speech segments which are delivered at low relative magnitude consistently exceed the threshold.

In environments such as those which use public switched telephone networks, the range of speech levels encountered overlaps the range of noise levels generally existing. For a given set of connections establishing a communication path, a given fixed threshold will be too high and low level speech signals will be lost. On other connections, the background noise will be at or near the threshold which will cause the activity criteria indicative of speech signals on the channel to approach 100% thereby over-dedicating the available channel capacity to a given set of communicators.

A solution to the problems noted above is obviously to adjust the threshold level so that it is always just above the background noise level. This adjustment must be made when only noise is present on the line or in the channel. Therefore, the problem becomes one of determining how to distinguish between speech and background noise. This of course was the original problem for which the varying threshold solution was proposed and hence an effective means and method of carrying out this technique is necessarily iterative and continuous.

The prior art solutions just discussed have not inexpensively and effectively solved the voice activity detection problem in a manner easily adapted to the satellite communication network problems where channel capacity is at a premium and electronic processing capability is costly and/or limited.

OBJECTS OF THE INVENTION

In view of the foregoing difficulties and shortcomings with the known prior art, it is an object of this invention to provide an improved voice activity detection apparatus and method which will effectively set a variable threshold for a comparison standard above which speech signals are defined and below which noise or inactivity is defined so that an effective allocation of channel capacity can be made.

A second object of the present invention is to provide an improved voice detection apparatus which operates in real time and effectively provides an accurate floating threshold level for controlling allocation of the channel capacity to various potential users.

SUMMARY

The foregoing objects and others not enumerated are met in the present invention by providing a sampling circuit for the analog signal input. The sampling circuit is operated n times in a period of time t where t is less than ½ the syllabic rate of speech. The magnitude M of each sample so taken is measured or calculated and the largest value encountered during the period is stored as $\overline{M}(t)$. This value is compared to the previously stored value for a previous period of time $t-1$ which represents the smallest $\overline{M}(t)$ from the prior periods. The lesser of the two values is stored as a new value $\overline{M}(t-1)$. The process continues for i periods of time t where i·t is greater than the syllabic period of speech. At the end of the $i^{th}$ period, the value stored is multiplied by a constant k and the product is stored as the threshold value for the next i periods of time and the value $M(t-1)$ is set to a high level.

BRIEF DESCRIPTION OF THE DRAWINGS

The present invention will now be described in greater detail with reference to illustrative drawings of a preferred embodiment thereof and a detailed specification in which.

DETAILED SPECIFICATION

Figure 1:
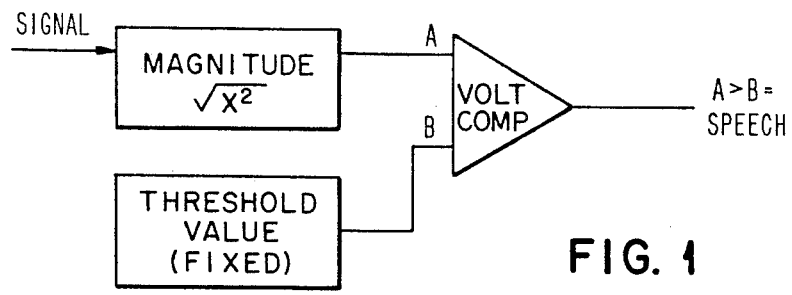
FIG. 1 is a schematic diagram of a generalized fixed threshold speech detection circuit.

Turning to FIG. 1, a generalized speech detection apparatus and technique are illustrated. In FIG. 1, an incoming signal having a value X at a given instant and a magnitude value or level of $\sqrt{X^2}$ is compared against a fixed threshold value in a comparator as shown. When the value of the incoming signal magnitude exceeds that of the threshold, "speech" is defined to be present. The detection signal so produced can be used to allocate communication channel capacity to the transmission of data presented by the speech signal X. During periods when the incoming signal X has a magnitude less than the threshold value, the channel capacity may be allocated to other users.

Figure 2:
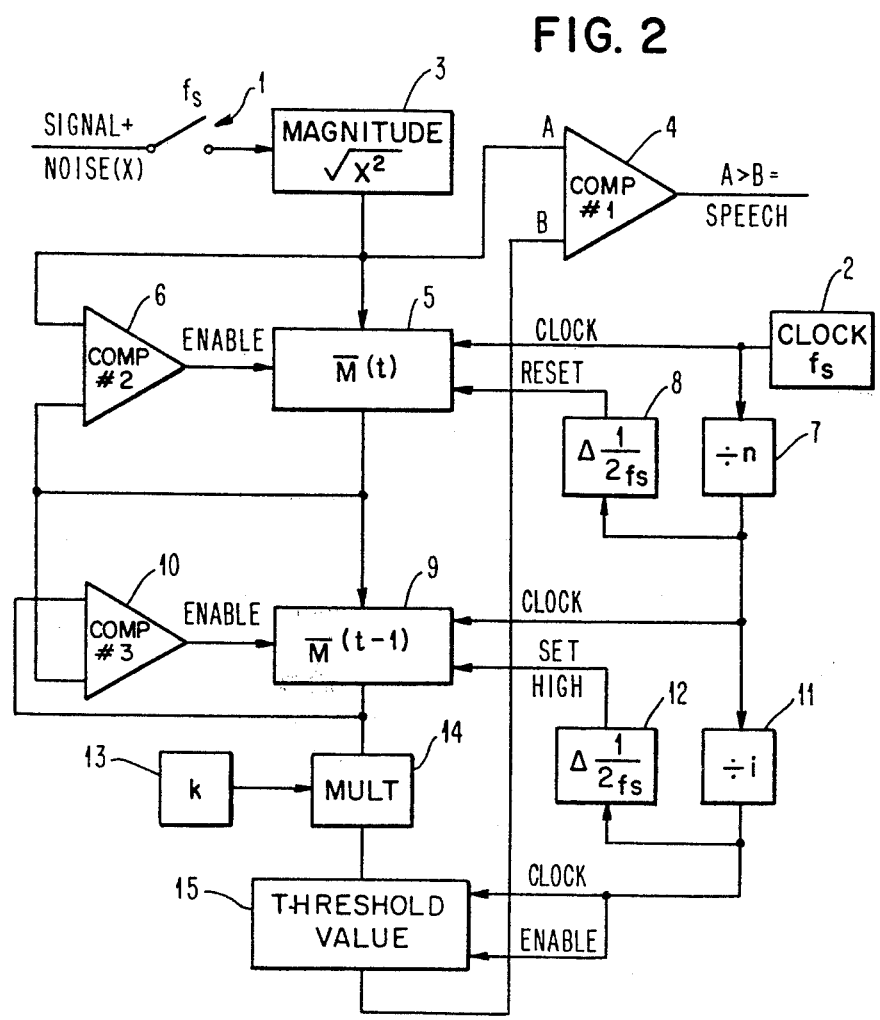
FIG. 2 is a schematic diagram of a variable threshold speech activity detection circuit as a preferred embodiment of the present invention.

In FIG. 2, the preferred embodiment of the present invention, the generation apparatus for the variable threshold for comparison against the incoming signal level is shown. In FIG. 2 an incoming signal and/or noise component of a signal X is sampled at a sampling frequency $f_s$ by a sampling switch schematically illustrated as 1 and driven at a sampling rate $f_s$ established by a clock 2. This sample is then converted to the absolute value in the magnitude circuit generally illustrated as 3. This produces an output identified as signal A which is, in the final analysis, compared in comparator 4 against a threshold level B in the same manner as illustrated in FIG. 1 so that if the A signal exceeds that of B, speech signals are defined as detected.

However, the A signal output is also stored under certain conditions as the value $\overline{M}(t)$ in register 5. Whether the value A is stored in register 5 is determined by the comparator 6 which compares the signal level A against the previously existing value in register 5. If the value of A is greater then, it will be stored in register 5 as a new value. Register 5 is read out at the clocking rate $f_s$ established by clock 2 and is reset once every n clock periods as set by the divide by n circuit 7 with the pulse delay 8 included to assure that the reset signal will occur after the setting of register 9.

The value coming from register 5 may be stored as a threshold value $\overline{M}(t-1)$ in register 9 once every n clock periods under certain circumstances as follows.

The value coming from register 5 is compared in comparator 10 against the contents of register 9 as shown. If the new value coming from register 5 is less than that in register 9, an enable signal is given by comparator 10 to load the contents from register 5 into register 9 as shown. This occurs once every n cycles from clock 2 as established by the divide by n circuit 7 as shown. A divide by i circuit 11 counts the n periods developed by divide by n circuit 7 to control, through pulse delay 12, a reset of register 9. The reset of register 9 actually sets the contents to a high level so that the next occurring value from register 5 will be lower than the content of register 9. This level may be chosen as the maximum level that can be contained in the register (a content of all 1's) or at any arbitrary level below which no speech signals are desired to be detected such as the minimum acceptable level of speech signals that one desires to have.

The contents of register 9 which are read out once every $i^{th}$ period under the control of divide by i counter 11 are multiplied by a constant value k stored in a constant value register 13, multiplied in multiplier 14 and stored in a threshold value register 15 once every (nxi)$^{th}$ clock period as shown. The threshold value stored in register 15 is sent as the "B" comparison signal to comparator 4 to determine whether speech signals are defined in a given sample. The value stored in register 15 is constantly present at the output and a new value is loaded into this register whenever the enable and the clock inputs go to a high level.

The actual value for the various timings and variables are not too critical. The following numbers have been experimentally determined in an implementation of the preferred embodiment of this detector:

n = 480,
t = 15 milliseconds,
i = 60,
k = 2.25.

The following general rules can be used in choosing the values for the preferred embodiment as just given:

t/n should be greater than the Nyquist rate.

2t should be less than the syllabic rate of speech.

i·t should be much much greater than the syllabic period.

where k is proportional to i/t where k has been found by experiment to produce the best result when it lies in a range 1.9 to 3.0 with the preferred value for the present embodiment being 2.25.

This speech detection circuit and method have been implemented and tested and have been found to work exceptionally well in real time. The circuitry is simple and inexpensive and of small size so that it may be easily implemented in large scale integration. The detector described is unique since the threshold level is constantly adjusted to the proper value without resorting to spectrum analysis to differentiate between speech and noise signal levels. The hardware cost used is much less than that for spectrum analysis and it can be used in the product rather than just within the laboratories as spectrum analysis techniques often are.

Having thus described my invention, what I claim as new, and desire to secure by Letters Patent is:

1. In a communication system having means for adjustably setting a detection threshold value for an incoming signal stream above which threshold value speech signals are defined to exist and below which threshold value no speech signals are defined to exist, a method for periodically adjusting and setting a new operative level for said detection threshold, comprising steps of:

instantaneously sampling the signal level of said incoming signal stream n times in a period of time t;

measuring the magnitude M of each said sample;

comparing the magnitude M of each successive said sample with the magnitude M of the preceding said sample;

storing the largest magnitude M encountered during said period of time t as the peak sample magnitude $\overline{M}(t)$;

comparing said value $\overline{M}(t)$ to a previous value $\overline{M}(t-1)$ which represents the smallest $\overline{M}(t)$ from prior periods of time t; and following said comparison, storing the lesser of said two magnitudes as the new value $\overline{M}(t-1)$;

repeating said foregoing steps for i periods of time t and then multiplying the latest existing value of $\overline{M}(t-1)$ by a constant k; and storing said product as said new operative threshold level for use during the next i periods of time t; and resetting said value $\overline{M}(t-1)$ to a level above that for the minimum level of speech desired to be detected for samples to be taken over the next said period of time t.

2. A method as described in claim 1, wherein:

said n is approximately 480, said t is approximately 15 milliseconds, said i is approximately 60 and k is approximately 2.25.

3. Apparatus for adjustably setting a detection threshold value for an incoming signal stream above which values speech signals are defined to exist and below which values speech signals are defined not to exist, comprising:

sampling means for instantaneously sampling the signal appearing at an input thereof supplied with an input signal, said sampling being conducted n times in a period of time t;

means connected to said sampling means for measuring the magnitude M of each said sample;

comparing means connected to said means for measuring the magnitude of said samples for comparing each successive sample magnitude with the largest sample magnitude of the preceding said samples;

storage means connected to said means for measuring the magnitude of said sampled and controlled by said comparing means for storing the largest magnitude M encountered during said period of time t as a peak sample magnitude $\overline{M}(t)$;

storage means for storing a previous value $\overline{M}(t-1)$;

comparing means connected to said storage means storing said peak sample magnitude $\overline{M}(t)$ and to said storage means storing said value $\overline{M}(t-1)$; and storing means connected to said means for comparing the values $\overline{M}(t)$ and $\overline{M}(t-1)$ for storing the lesser of said two magnitudes as a new value representing $\overline{M}(t-1)$ which represents the smallest value of $\overline{M}(t)$ from prior periods of time t;

multiplying means connected to said means for storing said value $\overline{M}(t-1)$ by a constant k; and storing means for storing said product from said multiplying means as a new operative threshold level for use during the next i periods of time t; and means for resetting said value $\overline{M}(t-1)$ once every i periods of time to a level above that desired to be detected.

* * * * *